United States Patent [19]

Hayakawa et al.

[11] Patent Number: 4,995,285
[45] Date of Patent: Feb. 26, 1991

[54] FAIL-SAFE HYDRAULIC CONTROL VALVES IN AN AUTOMATIC TRANSMISSION

[75] Inventors: Youichi Hayakawa, Toyoake; Yoshinari Kuwayama, Tokoname; Yoshihiro Yamada, Anjo, all of Japan

[73] Assignee: Aisin AW Co., Ltd., Anjo, Japan

[21] Appl. No.: 293,253

[22] Filed: Jan. 4, 1989

[30] Foreign Application Priority Data

Oct. 6, 1988 [JP] Japan ................. 63-252737

[51] Int. Cl.⁵ .................. F16H 59/00; F16H 61/00; F16H 45/00
[52] U.S. Cl. ........................... 74/869; 74/868
[58] Field of Search ............. 74/860, 861, 869, 867, 74/866, 762, 763, 785, 781 R, 720.5, 740, 868

[56] References Cited

U.S. PATENT DOCUMENTS

| 4,351,206 | 9/1982 | Lemieux et al. ............ 74/866 |
| 4,841,816 | 6/1989 | Bullock ................... 74/866 X |

FOREIGN PATENT DOCUMENTS 2181799  4/1987  United Kingdom .......... 74/763

Primary Examiner—Leslie A. Braun
Assistant Examiner—Khoi Q. Ta
Attorney, Agent, or Firm—Kanesaka and Takeuchi

[57] ABSTRACT

The first and second emergency control valves are a back up device in case all solenoid valves are in failure (non electrified). When the first and second solenoid valves are all off due to wire disconnection and the like in case the manual valve is at the 3 range, a 1-2 shift valve is constrained by the first emergency control valve, so that the hydraulic control device becomes the third speed mode. In case te manual shift lever is at the 2 range and a 2-3 shift valve, the 2-3 shift valve are constrained by the first and the second emergency control valves, so that the hydraulic control device becomes the second speed mode. In case the manual shift lever is at the 1 range, the first emergency control valve is constrained, and the 2-3 shift valve is constrained by the second emergency control valve, so that the hydraulic control device becomes the first speed mode. When the manual valve is at the D range, the fourth speed mode is attained in case the first and second solenoid valves are all off.

3 Claims, 4 Drawing Sheets

FIG.4

| POSITION | | SOLENOID | | | CLUTCH | | | BRAKE | | | | O.W.C | | |
|---|---|---|---|---|---|---|---|---|---|---|---|---|---|---|
| | | S1 | S2 | S4 | C1 | C2 | C3 | B1 | B2 | B3 | B4 | F1 | F2 | F3 |
| P | | × | ○ | | | | | | | | ○ | | | |
| R | V≤7 | × | ○ | | | ○ | | | ○ | | ○ | | | |
| | V>7 | ○ | ○ | | | ○ | | | | × | ○ | | | |
| N | | × | ○ | | | | | | | | ○ | | | |
| D | 1ST | × | ○ | | ○ | | | | | | ○ | | ○ | ○ |
| | 2ND | ○ | ○ | ◎ | ○ | | | | ○ | ○ | ○ | ○ | | ○ |
| | 3RD | ○ | × | ◎ | ○ | ○ | ○ | | ○ | ○ | | ○ | | |
| | 4TH | × | × | ◎ | ○ | ○ | ○ | ○ | | | | | | |
| 3 | 1ST | × | ○ | | ○ | | | | | | ○ | | ○ | ○ |
| | 2ND | ○ | ○ | ◎ | ○ | | | | ○ | ○ | ○ | ○ | | ○ |
| | 3RD | ○ | × | ◎ | ○ | ○ | ○ | | ○ | ○ | | ○ | | |
| | (3RD) | × | × | ◎ | ○ | ○ | ○ | | ○ | ○ | | ○ | | |
| 2 | 1ST | × | ○ | | ○ | | | | | | ○ | | ○ | ○ |
| | 2ND | ○ | ○ | | ○ | | | | ○ | ○ | ○ | ○ | | ○ |
| | (3RD) | ○ | × | ◎ | ○ | | ○ | | ○ | ○ | | ○ | | |
| | (2ND) | × | × | | ○ | | | | ○ | ○ | ○ | ○ | | |
| 1 | 1ST | × | ○ | | ○ | | | | ○ | | ○ | | ○ | ○ |
| | 2ND | ○ | ○ | | ○ | | | | ○ | ○ | ○ | ○ | | ○ |
| | (3RD) | ○ | × | ◎ | ○ | | ○ | | ○ | ○ | | ○ | | |
| | (1ST) | × | × | | ○ | | | | | ○ | ○ | | ○ | ○ |
| REMARKS | | ○ ON | | | APPLIED | | | | | | | | | |
| | | × OFF | | | RELEASE | | | | | | | | | |
| | | ◎ ON:L-UP ON / OFF:L-UP OFF | | | | | | | | | | | | |

…

FAIL-SAFE HYDRAULIC CONTROL VALVES IN AN AUTOMATIC TRANSMISSION

BACKGROUND OF THE INVENTION

1. Field of the Invention

The present invention relates to a hydraulic control device which is suitable for an automatic transmission mechanism mounted on a vehicle, in particular to a hydraulic control device suitable for an automatic transmission having forward four speed modes, in detail, a hydraulic control device which is able to make a certain speed shift by a manual shift lever when electric failures occur.

1. Description of the Prior Art

A fail-safe mechanism which is able to conduct shifting operation to a certain degree by a manual shift lever is incorporated in the automatic transmission, in order not to disable controlling of the automatic transmission too soon even at electric accidents.

Conventionally, a four speed automatic transmission composed of a main automatic transmission mechanism and a sub transmission mechanism to change an under-drive (or an over-drive) and direct driving employs a hydraulic control device composed of two solenoid valves for shifting and three shift valves. The four speed automatic transmission, when the two solenoid valves are under non-electrified condition due to electric failure and the like, is designed to be changed to a first speed at an L range of a manual shift lever, to be changed to third speed at a 2 range and to be over-drive (fourth speed) at a D range.

The applicant of the present invention has proposed an hydraulic device for a forward four or five speed automatic transmission including a manual shift lever (manual valve) having seven positions (1, 2, 3, D, N, R, P ranges), as shown in the Japanese Laid Open Patent Application No. Sho-63-1394. This hydraulic control device, when all the solenoid valves are under non-electrified condition, is designed to be changed to a second speed at a 1 range, to be changed to a second speed at a 2 range, to be changed to a third speed at a 3 range and to be changed to a fourth speed at a D range.

In the hydraulic control device in the automatic transmission composed of the seven positions, a second speed mode is set at a 1 range, which forces a vehicle to start from a second speed mode by the manual shift lever when electric failures occur, although it is, in respect of safety and efficiency of a vehicle, desirable to let each shifting speed correspond to each ranges, when all the solenoid valve are under non-electrified condition due to electric failures. For example, by control of a manual shift lever a P range corresponds to parking, an R range to reverse running, an N range to neutral, a D range to fourth speed mode (over-drive), a 3 range to third speed mode, a 2 range to second speed mode and a 1 range to first speed mode.

If other solenoid valves are used so that each shifting speed corresponds to each range, the reliability of fail-safe mechanism at an electric failure declines and a cost-up of a automatic transmission is caused.

SUMMARY OF THE INVENTION

This invention is purposed to provide a hydraulic control device having a manual valve of seven positions, which is partially modified to let each shift speed correspond to each range of the manual valve only by two solenoid valves, namely without adding a solenoid valve.

The present invention, taking the above-mentioned situation into consideration, for example, as shown in FIG. 1, offers the following provision in a hydraulic control device (U) having hydraulic servos for frictional engaging elements for a shift gear mechanism of an automatic transmission attaining forward four speeds and reverse one speed, (Cl), (C2), (C3), (B1, (B2), (B3) and (B4); first, second and third shift valves (9), (10) and (11) to control hydraulic pressure working on respective hydraulic servos; a first solenoid valve (S1 to control the first and third shift valves (9) and (11), a second solenoid valve (S2) to control the second shift valve (10); and a manual valve (7). A remarkable feature is as follows: a first emergency control valve (5) having a first port $(D_6)$ connected to a D range port of the manual valve (7), a second port $(b_1)$ connected to a control chamber $(b_2)$ of the first shift valve (9), which is situated against a control chamber $(9a)$ where control pressure from the first solenoid valve is applied; a second control chamber $(1_2)$ connected to a 1 range port of the manual valve (7) so that the first port $(D_6)$ and the second port $(b_1)$ are disconnected by applying control pressure to the second control chamber $(1_2)$ when the first and the second solenoid valves are off at the 1 range; a first control chamber $(a_1)$ connected to the second solenoid valve (S1 so that the first and second ports are connected by applying control pressure to the first control chamber $(a_1)$ at a third speed mode of a 3 range. And a second emergency control valve (6) having a first port $(2_2)$ connected to a 2 range port of the manual valve (7); a second port $(c_1)$ connected to a control chamber $(c_2)$ of the second shift valve 10, which is situated against a control chamber $(10a)$ where control pressure from the second solenoid valve is applied; a control chamber $(e_1)$ connected to the first solenoid valve $(S_1)$ so that the first port $(2_2)$ and the second port $(c_1)$ are connected by applying control pressure to the control chamber $(e_1)$ is provided.

Based on the above structure, when the first and second solenoid valves, (S1) and (S2) are off due to electric failures by current shut off and the like, the second solenoid valve (S2) becomes supplied condition at the 3 range of the manual shift lever. Then the hydraulic pressure is applied to the first control chamber $(a_1)$ of the first emergency control valve (5) by an oil passage (a) and this valve (5) is changed to an upper-half position as to connect the port $(D_6)$ and the port $(b_1)$ against a pressing member (5c). So the line pressure, which is applied to the back control oil chamber $(b_2)$ of the first shift valve (9) from the D range port (D) of the manual valve (7) through oil passages $(D_2)$, $(D_5)$, a port $(D_6)$, a port $(b_1)$ and an oil passage (b) switches the valve (9) to a lower-half position so that a port $(D_{10})$, a port $(f_1)$, a port $(i_1)$, and a port $(h_2)$ are connected. This switching is operated against the controlling pressure working on the control chamber $(9_a)$, based on the supplying condition of the first solenoid valve (S1). In the control oil chamber $(3_2)$ of the third shift valve (11), based on an off condition of the first solenoid valve (S1), the line pressure works against the control pressure working on the control chamber $(11a)$ and switches the shift valve (11) to the lower-half position where a port $(h_1)$ and a port $(g_2)$ are connected. Furthermore, as the control pressure works on the control chamber $(10_a)$ based on the off condition of the second solenoid valve (S2), the second shift valve (10) switches the valve (10)

to the upper-half position where a port (p₁) and a port (m₁) are connected. At this state, the line pressure which is applied from the D range port (D) of the manual valve (7) is applied to a hydraulic servo (C1) for the first clutch (C1) through the oil passages (D₂) and (D₃) and also applied through the oil passage (D₉) divided from the oil passage (D₂), the port (D10) of the first shift valve (9), the port (fl) and an oil passage (f) to the hydraulic servo (B2) for the second brake. The hydraulic pressure to the hydraulic servo (B2) after the engagement of the second brake B2 is applied to the back control chamber (12a) of the first brake sequence valve (12) through the oil passage (j) and switches the valve (12) to the upper-half position where the port (g₁) and the port (f₂) are connected. By this, the line pressure applied from the D range port (D) of the manual valve (7) is applied to the hydraulic servo (B1) for the first brake through the oil passage (f″) divided form the oil passage (f), the ports (f₂) and (g₁) of the sequence valve (12) for the first brake, the oil passage (g), the port (g₂), a port (h₁) and an oil passage (h), ports (h₂), (i₁) of the first shift valve (9) and the oil passage (i). While, the line pressure applied from the oil source (P) to the port (p₁) of the second shift valve (10) through the oil passage (p) is applied from the port (m₁) to the hydraulic servo (C3) for the third clutch through the oil passage (m), as the port (p₁) and the port (m₁) are connected. Due to the above, when the manual shift lever is at the 3 range, the line pressure is applied to the servos (C1) and (C3) for the first and the third clutches and the servos (B1) and (B2) for the first and the second brake, so that the hydraulic pressure control device (U) is changed to the third speed mode.

When the manual shift lever is at the 2 range, the line pressure from the D range port (D) of the manual valve (7), as same as the previous 3 range, constrains the first shift valve (9) under the lower-half position through the first emergency control valve (5). While the line pressure from the 3 range port, as same as previous 3 range, constrains the third shift valve (11) under the lower-half position. And based on the first solenoid valve (S1) being off, the hydraulic pressure is applied to the control chamber (e₁) of the second emergency control valve (6) through the oil passage (e), so that the port (2₂) and the port (c₁) are connected with opposing the pressing means (6c). (the upper-half position) By this, the line pressure from the 2 range port (2) of the manual valve (7) is applied to the back control chamber (c₂) of the second shift valve (10) through the oil passage (2₁), the ports (2₂) and (c₁)and, the oil passage (c). Then the application of the hydraulic pressure switches the second shift valve (10) to the lower-half position so that the port (p₁) and the port (k₁) are connected by opposing the control pressure working on the front control chamber (10a) based on the second solenoid valve (S2) being off and with the pressing force of the pressing mean (10c). Under this condition, the line pressure is applied to the first clutch hydraulic servo (Cl), the first brake hydraulic servo (B1), the second brake hydraulic servo (B2) and the fourth brake hydraulic servo (B4), and thus the hydraulic device becomes the second speed mode.

Further, when the manual shift lever is at the 1 range, based on the second solenoid valve (S2) being under supply condition, the control pressure is applied to the first control chamber (a₁) of the first emergency control valve through the oil passage (a), and at the same time, the control pressure is applied from the 1 range port (1) of the manual valve (7) to the first control chamber (1₂) of the first emergency control valve (5). Then the control pressure in the chamber (1₂) and the pressing means (5c) hold the valve (5) under the lower-half position so that the port (D₆) and the port (b₁) are connected. On the other hand, the second emergency control valve (6) is kept under the upper-half position as same as the previous 2 range. Accordingly the control pressure applied from the 3 range port (3) and the 2 range port (2) of the manual valve (7) constrain the first and second shift valves (9), (11) under the lower-half position as same as the previous 2 range. However, because of the port (D₆) and the port (b₁) of the first emergency control valve (5) being disconnected, the control pressure is not applied to the back control chamber (b₂) of the first shift valve (9) through the oil passage (b), and the shift valve (9) is switched to the upper-half position so that the port (o₂) and the port (q₁) are connected by the control pressure applied to the front control chamber (9a) based on the supply condition of the first solenoid valve (S1). Consequently the line pressure from the 1 range port (1) of the manual valve (7) is applied to the third brake hydraulic servo (B3) through the oil passage (1₁), the ports (1₅) and (o₁) of the third shift valve (11), the oil passage (o), the ports (o₂) and (q₁) of the first shift valve (9), and the oil passage (q). And as same as the 2 range, the line pressure is applied to the first clutch hydraulic servo (C1) and the fourth brake hydraulic servo (B4). Thus when the manual valve is at the 1 range, the line pressure is applied to the first clutch hydraulic servo (Cl), the third and fourth brake hydraulic servos (B3), (B4), so that the hydraulic control device becomes under the first speed mode. Incidentally, when the manual shift lever is at the D range, at the fourth speed mode, the first and the second solenoid valves (S1) and (S2) are both off, so that even if the solenoid valves (S1) and (S2) are off due to electric failures such as wire disconnection and the like, the hydraulic device is kept under the fourth speed mode.

Incidentally, the reference numerals in the parentheses are used only for reference with the drawings and do not define the invention. The same number may be named differently in the following description and in the previous description in which broader concepts are adopted.

DETAILED DESCRIPTION OF THE PREFERRED EMBODIMENTS

The present invention will now be explained along with the drawings.

Figure 2:
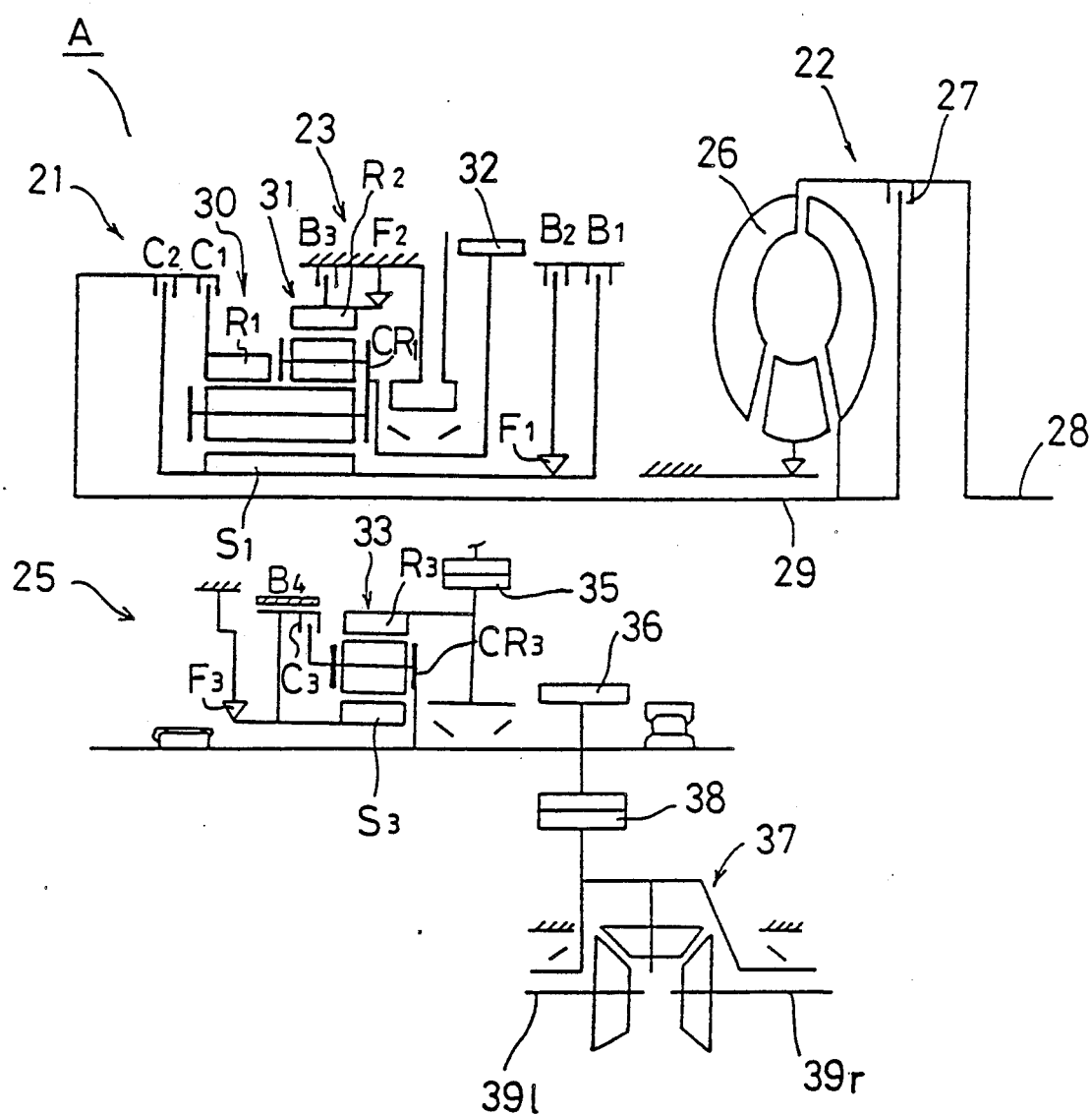
FIG 2 is a schematic illustration of an automatic transmission suitable for the present invention.

Now referring to FIG. 2, an automatic transmission A includes a shift gear mechanism 21 having a three speed automatic transmission mechanism 21, a torque converter section 22, and an under drive mechanism 25.

The torque converter section 22 has a torque converter 26 and a lock-up clutch 27, whereby rotation of an engine crank shaft 28 is transmitted to an input shaft 29 through the torque converter 26 hydraulically, or through a mechanical connection of the lock-up clutch 27.

The three speed automatic transmission mechanism 23 has a planetary gear unit composed of a single planetary gear 30 and a dual planetary gear 31. In the planetary gear unit, the sun gears of the two planetary gears are integrally linked to form a common sun gear S1, and carriers are integrally linked to form a common carrier CR1. The input shaft 29 and a ring gear R1 (a small ring gear) of the single planetary gear 30 are connected through a first (forward) clutch C1. The input shaft 29 and a sun gear S1 are connected through a second (reverse) clutch C2. The sun gear S1 is restrained directly by a first (2nd coast) brake B1 and is restrained in one-way rotation by a second (2nd) brake B2 through a first one-way clutch F1. A ring gear R2 (a big ring gear) of the dual planetary gear 31 is restrained directly by a third (1st coast and reverse) brake B3 and is restrained in one-way rotation by a second one-way clutch F2. The carrier CR1 is connected to a counter drive gear 32 which is an output member for the three speed automatic transmission mechanism 23.

The under drive mechanism 25 has a single planetary gear 33, whose ring gear R3 is connected to a counter driven gear 35 which invariably meshes with the counter drive gear 32, and a carrier CR3 is connected to an output pinion 36. further the sun gear S3 is restrained directly by a fourth (under drive) brake B4 and is restrained by a one-way clutch F3. And the sun gear S3 is connected to a carrier CR3 through a third (under drive direct) clutch C3.

The output pinion 36 is connected to a front differential device 37 through a ring gear 38, and the differential device 37 has left and right front axle shafts 39$l$, 39$r$.

Figure 1:
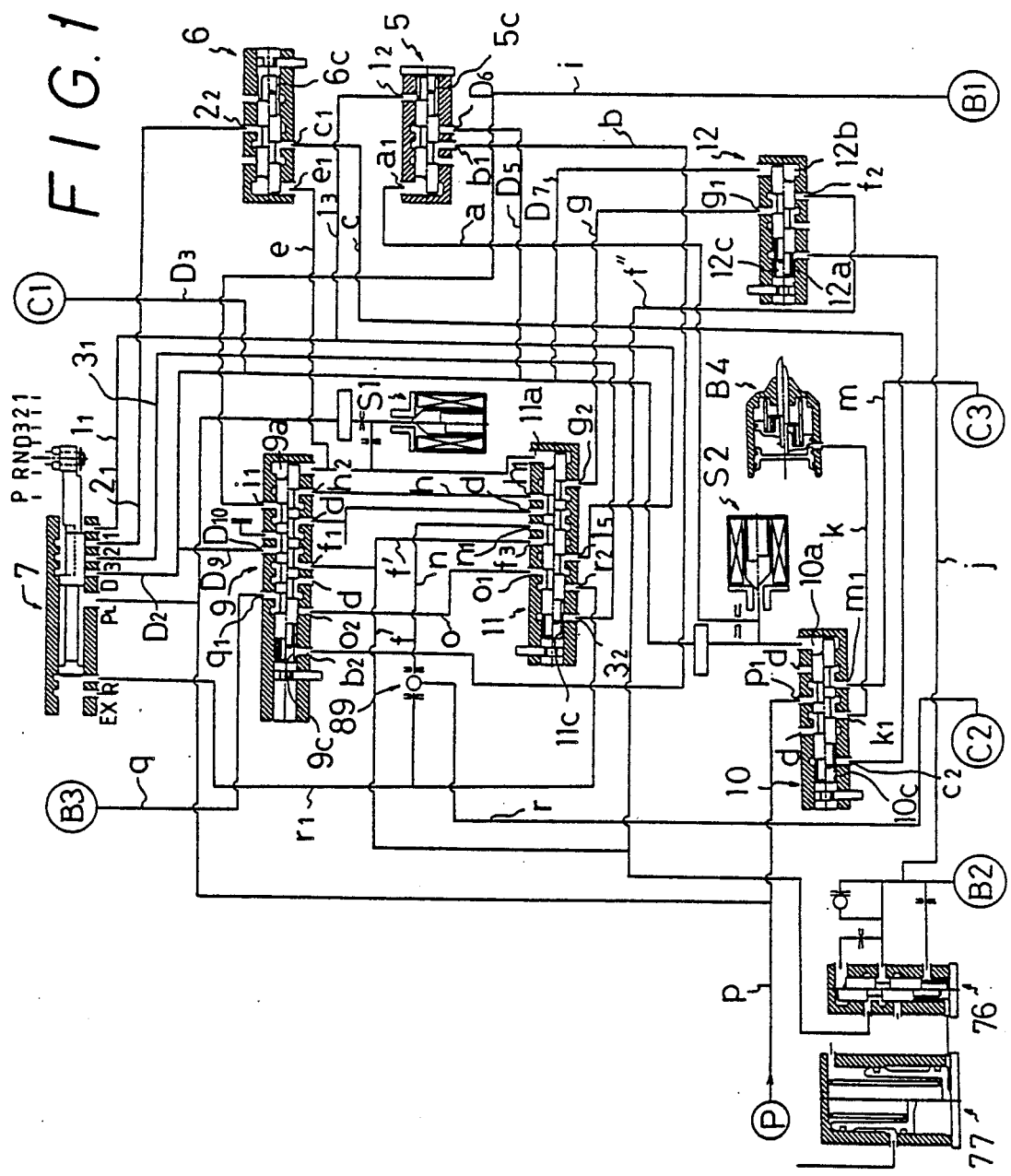
FIG. 1 is a cross sectional view of an important part of a hydraulic control device of the present invention.
Figure 3:
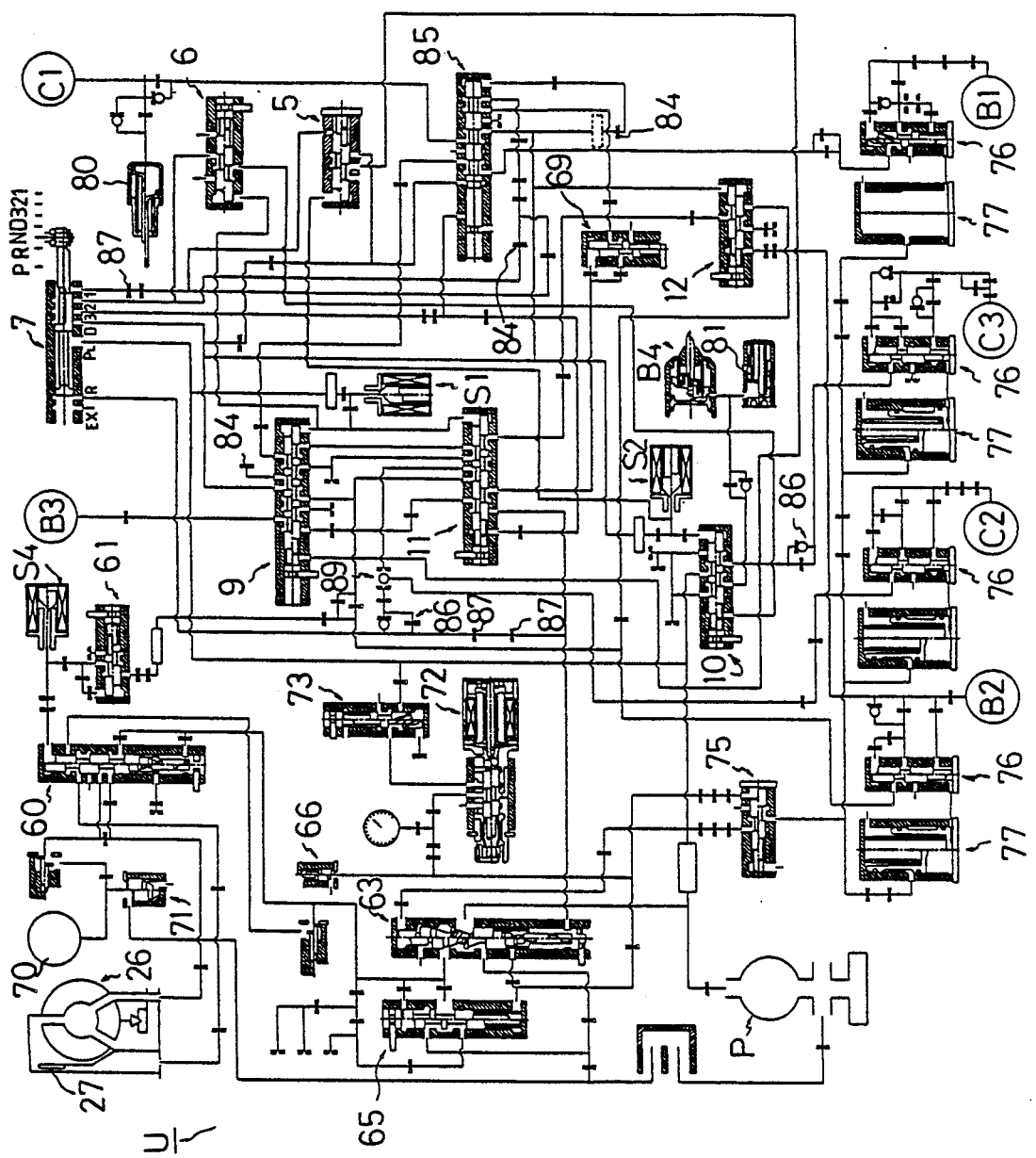
FIG. 3 is a hydraulic circuit diagram of the automatic transmission, FIG. 4 a table of operation of the automatic transmission.

And the four speed automatic transmission A, as shown in FIG. 1 and FIG. 3, is controlled by a hydraulic circuit U.

In the circuit U, C1, C2, C3 are hydraulic servos for the clutches $C_1$, $C_{2c}$ $C_3$, while B1, B2, B3, Br are hydraulic servos for the brakes $B_1$, $B_2$, $B_3$, $B_4$. 7 is a manual valve, 9 is a 1–2 shift valve composing a first shaft valve, 10 is a 2–3 shift valve composing a second shift valve, and 11 is a 3–4 shift valve composing a third shift valve. S1 is a first solenoid valve controlling the 1–2 shift valve 9 and the 3–4 shift valve 11. S2 is a second solenoid valve controlling the 2–3 shift valve 10, 5 and 6 are first and second emergency control valves which are back-up means in case of the failures of the solenoid valves due to wire disconnection (non-electrified condition) and the like, and 12 is a sequence valve for the first brake B1.

Moreover, as shown in FIG. 3, 60 is a lock-up control valve, S4 is a fourth solenoid valve to duty-control the lock-up control valve 60, and 61 is a lock-up modulator valve to stabilize the duty-control of the solenoid valve. 63 is a primary regulator valve, 65 is a secondary regulator valve, 66 is a pressure relief valve, and 69 is a low modulator valve. Further more 70 is an oil cooler, 71 is a cooler bypass valve, 72 is a throttle valve composed of a linear solenoid valve, which is capable of controlling hydraulic pressure freely, and 73 is a solenoid modulator valve stabilizing the control of the solenoid valve. 75 is an accumulator control valve. 26 is the torque converter, 27 is the lock-up clutch, and P is an oil pump. And to each of the second clutch hydraulic servo C2, the third clutch hydraulic servo C3 and the second brake hydraulic servo B2, a regulating valve 76 and an accumulator 77 are connected. On the other hand setting type accumulators 80 and 81 are connected to the first clutch hydraulic servo C1 and the fourth brake hydraulic servo B4.

Incidentally, in FIG. 3, a symbol 84 like a condensor mark is a separator plate blocking oil passages. In addition 85 is a 4–5 shift valve used for five speed automatic transmission, but its control chamber is closed by a separator plate, so the valve 85 is not functioned. Due to the above configuration the hydraulic control device U for the four speed automatic transmission is capable of being used as a valve body for a five speed automatic transmission.

Furthermore, in FIG. 3, 86 is an orifice-attached check valve which is placed at required spots. 87 is an orifice, 89 is a three way cut off cock (non manual type). Incidentally these orifice attached check valve 86 and orifice 87 are eliminated in FIG. 1.

Next, the operation of the present invention will be explained.

With regard to the four speed automatic transmission A, by shifting the manual valve 7 to each range, the first and second solenoid valves S1, S2, and the fourth solenoid valve S4 for the lock-up clutch control, which are situated in the hydraulic control device U, are operated as shown in FIG. 4. Based on the motions of the solenoid valves, the clutches C1, C2 and C3, the brakes B1, B2, B3 and B4, the one-way clutches F1, F2 and F3 operate, so that shifting speed from 1st to 4th are obtained at each range P, R, D, 3, 2, 1 of the manual valve.

Namely, when the manual valve is at D range, a line pressure port $P_L$ and a D range port of the manual valve 7 are connected, and a line pressure in a line pressure passage p is applied to an oil passage $D_2$. Then at a first speed mode of D range, the first solenoid valve S1 is OFF which means a supply condition, and the second solenoid valve S2 is ON which means a drain condition. Accordingly the 1–2 shift valve 9 and the 3–4 shift valve 11 are at an upper-half position, and the 2–3 shift valve 10 is at a lower-half position. Under this condition, the line pressure from the port D of the manual valve 7 is applied to the first clutch hydraulic servo C1 through the oil passage $D_2$ and an oil passage $D_3$, while the line pressure in the line pressure passage p is applied to the fourth brake hydraulic servo B4 through ports $p_1$, $h_1$ of the 2–3 shift valve 10, and an oil passage h. Because of the above motions, the first (forward) clutch C1 is engaged and the fourth brake B4 operates. As a result, rotation of the input shaft 29 is transmitted to the small ring gear R1 through the clutch C1, and the big ring gear R2 is a stopped by the second one-way clutch F2, so the sun gear S1 idles reversely, the common carrier CR1 rotates in normal rotation direction with greatly reduced speed, and such reduced rotation is taken out from the counter drive gear 32 and transmitted to the counter driven gear 35 of the under drive (U/D) mechanism 25. The under drive mechanism 25 is under an under drive condition which in the fourth brake B4 and the third one-way clutch F3 operate, consequently, in the automatic transmission A as a whole, a first speed mode is obtained by the combination of a first speed o the three speed automatic transmission mechanism 23 and the under drive condition of the under drive mechanism 25. Incidentally, in the first speed, the B1 sequence valve 12 is switched to the lower-half position by applying the line pressure from the D range port D to a right (second) control chamber 10$b$ of the valve 11 through the oil passage $D_2$ and an oil passage $D_7$.

At a second speed mode of D range, from the first speed mode, the solenoid valve S1 is ON and drained. The the 1-2 shift valve 9 and the 3-4 shift valve 11 are switched to the lower half position. The line pressure from the port D is applied to the second brake hydraulic servo B2 through the oil passages $D_2$, $D_9$, the ports $D_{10}$, $f_1$ of the shift valve 9, and the regulating valve 76. Accordingly, under this condition, the second brake B2 operates in addition to the first clutch C1. Then the sun gear S1 is stopped by the operation of the first one-way clutch F1 based on the second brake B2, the rotation of the input shaft 29 is transmitted to the small ring gear R1, and the small gear R1 idles the big ring gear R2 in normal direction and rotates the carrier CR1 in normal rotating direction with reduced speed. Such reduced rotation is taken out from the counter drive gear 32 and transmitted to the counter driven gear 35 of the under drive mechanism 25. The under drive mechanism 25 is under the under drive condition, and accordingly in the automatic transmission A as a whole, the second speed mode is obtained by the combination of the second speed condition of the three speed automatic transmission mechanism 23 and the under drive condition of the under drive mechanism 25. After the second brake B2 is engaged, the hydraulic pressure to the second brake hydraulic servo B2 is applied to the B1 sequence valve 12. By this, the B1 sequence valve 12 is switched to the upper-half position. Under this stage, the line pressure is applied to a port $f_2$ of the B1 sequence valve 12 through an oil passage f' separate from an oil passage F. Furthermore, from a port $g_1$ of the valve 12, the line pressure is applied to supply the first brake hydraulic servo B1 through the oil passage g, the ports $g_2$, $h_1$ of the 3-4 shift valve 11. The soil passage h. The p9orts $h_2$. $i_1$ of the 1-2 shift valve 9 and the oil passage i. Thus the first brake $B_1$ is engaged. Consequently, at the time of up shift from the first speed mode to the second speed mode, mainly the second brake $B_2$ operates, so the sun gear S1 is stopped with adequate torque capacity, whereby shift shock is prevented. Further after the up shifting is completed, the first brake $B_1$ is engaged, so the halt of the sun gear is secured, so that a provision against excessive torque at starting is given and the engine brake operates at coasting.

At a third speed mode of D range, from the second speed mode, the second solenoid valve S2 is switched to OFF (supply condition). Then the 2-3 shift valve 10 is switched to the upper-half position. The line pressure in the line pressure passage p is applied to the third clutch hydraulic servo C3 through the ports $p_1$, $m_1$ of the 2-3 shift valve 10 and the oil passage m, and at the same time, the fourth brake hydraulic servo B4 is drained from a drain port $k_1$. Due to this motion, the three speed automatic transmission 23 remains being under the second speed condition, and the under drive mechanism 25 is under the direct connecting condition by the release of the fourth brake B4 and the engagement of the third clutch C3. Accordingly, in the automatic transmission A as a whole, the third speed mode is obtained by the combination of the second speed condition of the automatic transmission mechanism 23 and the direct connecting condition of the under drive mechanism 25. At this stage, the control pressure is applied to the front control chamber $a_1$ of the first emergency control valve 5 through the oil passage a because of the second solenoid valve S2 being off (supply condition). At this time, the line pressure from the D range port D of the manual valve 7 is applied to a back control chamber $b_2$ of the 1-2 shift valve 9 through oil passages $D_2$, $D_5$, the ports $D_6$, $b_1$, and the oil passage b.

At a fourth (4th) speed mode of D range, from the third speed mode, the first solenoid valve S1 is switched to OFF (supply) condition. Then the control pressure is applied to both the control chamber 9a of the 1-2 shift valve 9 and the control chamber 11a of the 3-4 shift valve 11. However, the 1-2 shift valve 9 is kept at the lower-half position because the control pressure of the back control chamber $b_2$ and the spring pressing force, so only the 3-4 shift valve 11 is switched to the upper-half position. As a result, the line pressure from the port D is applied to a port $f_3$ of the 3-4 shift valve 11 through the oil passage $D_2$, the ports $D_{10}$, $f_1$ and the oil passage f'. Further, the line pressure is applied to the three-way cock 89 (non manual type) through the port $n_1$ and the oil passage n, and then the line pressure is applied to the second clutch hydraulic servo C2 through the oil passage r. While based on the 3-4 shift valve 11 switched to the upper-half position, the port $h_1$ is connected to the drain port d, whereby the line pressure working on the regulating valve 76 is released. Due to this, the first (forward) clutch $D_1$ and the third clutch $C_3$ are engaged, and the second brake $B_2$ operates, in addition, the first brake $B_1$ is released and the second clutch $D_2$ is engaged. Then, the rotation of the input shaft 29 is transmitted to the small ring gear R1 through the first clutch $C_1$, and at the same time, transmitted to the sun gear S1 through the second clutch $C_2$. Accordingly each element of the planetary gear unit rotates together, and the same rotative speed as the input shaft is taken out from the carrier CR1. The rotation of the counter drive gear 32 is coupled to the direct connecting condition of the under drive mechanism 25, and then the fourth speed which is same the rotation speed as the input shaft 29 is taken out from the pinion 36. In the automatic transmission A as a whole, the over-drive rotation is obtained based on the gear ration of the pinion 36 and the ring gear 38. At this stage, the second brake hydraulic servo B2 is under supply condition based on the constrained condition of the 1-2 shift valve 5 at the lower-half position. Consequently the first brake $B_1$ is released, the second brake $B_2$ is under engaged condition, and the second clutch $C_2$ is engaged. Thus the clutch $C_2$ is engaged smoothly under the operation of the one-way clutch F1, so the shift shock by gear changes is prevented.

When the manual valve 7 is operated from the neutral (N) range to the reverse (R) range, the line pressure of the line pressure port $P_L$ is applied to the oil passage $R_1$ through the port R. Furthermore the line pressure of this oil passage $R_1$ is applied to the second clutch hydraulic servo C2 through the three way cock 89 and the oil passage k. At the shifting from the N range to the R range, when the vehicle is parking or running at slow speed (below 7 km/h), the first solenoid valve S1 is under supply condition. Accordingly the 1-2 shift valve 9 and the 3-4 shift valve 11 are under the upper-half position, the line pressure in the oil passage $R_1$ is led to the port $R_2$ of the 3-4 shift valve 11, and further, the line pressure is applied to the port $o_2$ of the 1-2 shift valve 9 through the port $o_1$ and the oil passage o. Thus the line pressure is applied to the third brake hydraulic servo B3 through the port $q_1$ and the oil passage q. Due to this, in the automatic transmission A, the second clutch C2 is engaged and the third brake operates. Then the rotation of the input shaft 29 is transmitted to the sun gear S1 through the second clutch C2, under this condition, the big ring gear rotates reversely and the carrier CR1 rotates reversely, and the rotation of the carrier is transmitted from the counter drive gear 32 to the under drive mechanism 25.

When the shifting from the N range to the R range, in case that the vehicle runs at more than certain speed (7 km/h), based on the signals from vehicle sped sensor to the control unit (not shown), the control unit sends signals to the first solenoid valve S1. Then the first solenoid valve is switched to drain, so that the 1-2 shift valve 9 and the 3-4 shift valve 11 are switched to the lower-half position. By this the ports $r_{2\ pl\ and\ o1}$ are disconnected, and the ports $o_2$ and $q_1$ of the 1-2 shift valve 9 are disconnected, and the port $q_1$ is connected to the drain port d. So the third brake hydraulic servo B3 is not applied with the line pressure and is drained. Accordingly the third brake B3 is released, and as a result, shifting to R range when running is prevented.

When the manual valve 7 is switched to the 3 range by the operation of the shift lever or the operation of switch, the line pressure in the line pressure port $P_L$ is connected to the 3 range port in addition to the D range port. The line pressure from the 3 range port is applied to the back control chamber $3_2$ of the 3-4 shift valve 11 through the oil passage $3_1$. At the 3 range, the first, second and third speed modes are as same as those of the D range.

At the third speed mode, the line pressure is applied to the back control chamber $b_2$ of the 1-2 shift valve 9 through the first emergency control valve 5 as same as the third speed mode and the fourth speed mode at the D range.

However, in case that the solenoid valves S1 and S2 are under non electrified condition due to electric failures such as wire disconnection and the like, namely the (3RD) condition shown in FIG. 4, the second solenoid valve S2 becomes supply condition, the control pressure is applied to the front control chamber $a_1$ of the first emergency control valve 5, so that the valve 5 is kept under the upper-half position with opposing the spring $5c$ to connect the port $D_6$ and the port $b_1$. Due to this, the line pressure from the D range port D of the manual valve 7 is applied to the back control chamber $b_2$ of the 1-2 shift valve 9 through the oil passages $D_2$, $D_5$, the ports $D_6$, $b_1$ and the oil passage b. At this time, the front control chamber $9a$ of the 1-2 shift valve 9 is applied with the control pressure based on the first solenoid valve being off. However the 1-2 shift valve 9 is kept under the lower-half position because of the control pressure applied to the back control chamber $b_2$ and the pressing force of the spring $9c$. And the line pressure is applied to the back control chamber $3_2$ of the 3-4 shift valve 11 from the 3 range port 3 of the manual valve 7 through the oil passage $3_1$. At this time, the front control chamber $11a$ is applied with the control pressure based on the first solenoid valves being off. However, the 3-4 shift valve 11 is kept under the lower-half position because of the control pressure in the back control chamber $3_2$ and the pressing force of the spring $11c$. Furthermore, the front control chamber $10a$ of the 3-4 shift valve 10 is applied with the control pressure based on the second solenoid valve S2 being off, then the 2-3 shift valve 10 is kept under the upper-half position. Under this condition, the line pressure from the D range port of the manual valve 7 is applied to the first clutch hydraulic servo C1 through the oil passages $D_2$, $D_3$, and the line pressure if applied to the second brake hydraulic servo B2 through the oil passage $D_9$ separate from the oil passage $D_2$, the ports $D_{10}$, $f_1$, the oil passage f and the regulating valve 76. Then after the second brake B2 is engaged, the hydraulic pressure to the servo B2 is applied to the back control chamber $12a$ of the B1 sequence valve 12 through the oil passage j, then the valve 12 is kept under the lower-half position, so that the ports $g_1$ and $f_2$ are connected. Because of this, the line pressure applied from the D range port of the manual valve 7 is applied to the first brake hydraulic servo B1 through the oil passage f" separate from the oil passage f, the ports $f_2$, $g_1$ of the B1 sequence valve 12, the oil passage g, the ports $g_2$, $h_1$ of the 3-4 shift valve 11, the ports $h_2$, $i_1$ of the 1-2 shift valve 9, and the oil passage i. While, the line pressure applied from the oil pump P through the oil passage p is applied to the third clutch hydraulic servo C3 through the port $p_1$, the port $m_1$ and the oil passage $m_1$ based on the 2-3 shift valve 10 being under the upper-half position. Accordingly, the first (forward) and the third (under drive direct) clutch hydraulic servos C1 and C3, and the first (2nd coast) and the second (2nd) brake hydraulic servo B1, B2 are applied with the line pressure, whereby the hydraulic control device becomes the third speed mode.

And, when the manual valve 7 is switched to the 2 range, the line pressure from the line pressure port $P_L$ is applied to the D range port D, the 3 range port 3 and the 2 range port 2, but, the oil passage from the 2 range port 2 is blocked by the separator 84, and consequently at the 2 range, the first speed mode and the second speed mode are as same as those of the 3 range.

In case the solenoid valves S1 and S2 are under non-electrified condition due to wire disconnection and the like, in other words, (2ND) condition shown in FIG. 4, the line pressure applied from the D range port D of the manual valve 7, as same as the 3 range, constrains the 1-2 shift valve 9 under the lower-half position through the first emergency control valve 5. The line pressure applied from the 3 range port 3, as same as the 3 range, constrains the 3-4 shift valve 11 under the lower-half position. Based on the first solenoid valve S1 being off, the control pressure is applied to the control chamber $e_1$ of the second emergency control valve 6 through the oil passage e, then the valve 6 is switched to the upper-half position with opposing the spring $6c$, so that the ports $c_1$ and $2_2$ communicate together. Due to this motion, the line pressure from the 2 range port of the manual valve 7 is applied to the back control chamber $c_2$ of the 2-3 shift valve 10 through the oil passage $2_1$, the ports $2_2$, $c_1$ and the oil passage d. Consequently, the valve 10 is kept under the lower-half position with opposing the spring $10c$ and the control pressure applied to the front control chamber $10a$ based on the second solenoid valve S2 being off, so that the ports $p_1$ and $k_1$ l are connected. Under this condition, the first (forward) clutch hydraulic servo C1, the first (2nd coast) brake hydraulic servo B1, the second (2nd) brake hydraulic servo B2 and the fourth (under drive) brake hydraulic servo B4 are applied with the line pressure, whereby the hydraulic control device becomes the second speed mode.

When the vehicle runs at high speed, in case the shift lever is mistakenly shifted from the D range to the 2 range, the hydraulic control device, as shown in (3RD) condition in FIG. 4, is once shifted to the third speed mode, so that sudden shift down to the second speed mode is prevented. Incidentally, at the 2 range, it is possible to shift from the first speed mode to the second, but it is not possible to shift to the third speed mode.

When the manual valve 7 is switched to the 1 range, the line pressure from the line pressure port $P_L$ is applied to the D range port D, the 3 range port 3, the 2 range port 2 and the 1 range port 1. At the 1 range, when the first speed mode, the first clutch hydraulic servo C1 and the fourth brake hydraulic servo B4 are applied with the hydraulic pressure, and in addition, the third brake hydraulic servo B3 is applied with the hydraulic pressure from the 1 range port 1 through the ports $1_5$, $o_1$ of the 3-4 shift valve 11 which is under the lower-half position, the ports $o_2$, $q_1$ of the 1-2 shift valve 9 which is under the upper-half position, and the oil passage q. Because of this, the big ring gear R2 is restrained by the third brake B3, the engine brake operates when coasting. Incidentally, the second speed mode is as same as that of the 2 range.

At the 1 range, in case that the solenoid valves S1, S2 are off due to wire disconnection and the like, as same as at the 2 range, the control pressure is applied to the front control chamber $a_1$ of the first emergency control valve 5, and further, the control pressure is applied to the back control chamber $1_2$ through the oil passage $1_3$ from the 1 range port 1 of the manual valve 7. And, the control pressure of the back control chamber $1_2$ and the spring 5c constrain the valve 5 under the lower-half position with opposing the control pressure in the front control chamber $a_1$, so that the ports $D_6$ and $b_1$ are disconnected. While, second emergency control valve 6, as same as the 2 range, is kept under the upper-half position. Accordingly the line pressure applied from the 3 range port and the 2 range port of the manual valve 7, as same as the case of the manual valve 7 being at the 2 range, the first and the third shift valves are kept under the lower-half position. However, due to the ports $D_6$ and $b_1$ being disconnected, the control pressure is not applied to the back control chamber $b_2$ of the 1-2 shift valve 9, thus the valve 9 is switched to the upper-half position by the control pressure applied to the front control chamber 9a of the valve 9 based on the solenoid valve S1 being under the supply condition, so that the port $o_2$ and $q_1$ are connected. The line pressure from the 1 range port of the manual valve 7 is applied to the third (1st coast and reverse) brake hydraulic servo B3 though the oil passage $1_1$, the ports $1_5$ and $o_1$ of the 3-4 shift valve 11, the oil passage o, the ports $o_2$ and $q_1$ of the 1-2 shift valve 9 and the oil passage q. As same as the 2 range, the first (forward) clutch hydraulic servo C1 and the fourth brake hydraulic servo B4 are applied with the line pressure, so that the hydraulic control device becomes the first speed mode.

When the vehicle runs at high speed, the shift lever is mistakenly shifted from the D range to the 1 range, the hydraulic control device, as shown in (3RD) condition in FIG. 4, is once shifted to the third speed mode, and further shifted to the first speed mode through the second speed mode. Incidentally, at the 1 range, it is not possible to shift to the second speed mode and the third speed mode.

When the manual valve 7 is at the R range, the line pressure is directly applied to the second clutch hydraulic servo C2 from the R range port, and the line pressure is applied to the third brake hydraulic servo B3 under the condition that the first solenoid valve S1 is off. Even if the second solenoid valve S2 is off, as the hydraulic pressure is applied to the second solenoid valve S2 from the D range port D, hydraulic pressure to operate the 3-4 shift valve 10 is not generated, so the 3-4 shift valve 10 is kept under the lower-half position, then the fourth brake B4 is engaged, and the under drive mechanism 25 is under the under drive condition. Thus the reverse running is maintained.

Incidentally, when the manual shift lever is at the D range, the first and the second solenoid valves S1, S2 are all off at the fourth speed mode. Accordingly in case these solenoid valves S1, S2 are under non electrified condition due to wire disconnection and the like, the hydraulic control device is kept under the fourth speed mode.

As a result, under the condition of the solenoid valves S1, S2 being off, the manual valve 7 is shifted by the manual shift lever to the D range, the 3 range, the 2 range, the 1 range and the R range, and the hydraulic control device is switched to the fourth speed mode, the third speed mode, the second speed mode, the first speed mode and the reverse mode corresponding to the above shift position of the manual valve 7.

TECHNICAL ADVANTAGES OF THE INVENTION

As explained, in spite of a quite simple modification such as installing the first emergency control valve (5) and the second emergency control valve (6), in case of the above solenoid valves being off (non electrified condition), the speed modes (4th speed mode), (3rd speed mode), (2nd speed mode), (1st speed mode) are set in accordance with the shift position of the manual valve (7), namely (D), (3), (2), (1), so that safety and driving performance are greatly improved. Furthermore, as expensive solenoid valves are not required in the modification, the device is not complicated and reliability on electric aspects is improved without large cost increase.

What is claimed is:

1. A hydraulic control device for an automatic transmission, comprising:
    a shift gear mechanism having rotational elements and frictional engaging elements;
    a plurality of hydraulic servos for connecting the frictional engaging elements, to rotational elements;
    first, second and third shift valves to control hydraulic pressure working on the hydraulic servos, said first and second shift valves having control chambers, respectively;
    a first solenoid valve for controlling said first and third shift valves;
    a second solenoid valve for controlling said second shift valve;
    a manual valve having a D range port, a 1 range port, a 2 range port and a 3 range port;
    a first emergency control valve having a first port connected to the D range port of the manual valve; a second port connected to the control chamber of the first shift valve, hydraulic pressure applied to the control chamber of the first shift valve operating against control pressure applied through the first solenoid valve; a first control chamber connected to the second solenoid valve so that the first and second ports are connected together by applying control pressure to the first control chamber; and a second control chamber connected to the 1 range port of the manual valve so that the first port and second port are disconnected by applying control pressure to the second control chamber when the first and second solenoid valves are off, and a second emergency control valve having a first port connected to the 2 range port of the manual valve; a second port connected to the control chamber of the second shift valve, hydraulic pressure applied to the control chamber of the second shift valve operating against control pressure applied through the second solenoid valve; and a control chamber connected to the first solenoid valve so that the first port and second port are connected together by applying control pressure to the control chamber of the second emergency control valve.

2. A hydraulic control device for an automatic transmission according to claim 1, wherein said shift gear mechanism includes a planetary gear unit formed of a single planetary gear having a ring gear, and a dual planetary gear having a ring gear, said planetary gear unit having a common sun gear and a common carrier to form an output member, and a sub gear unit formed of a single planetary gear, said sub gear unit being an under-drive with a direct-drive or an over-drive with a direct drive; a forward first speed is obtained when transmission power is input to the ring gear of the single planetary gear, and a ring gear of the dual planetary gear is restrained; a forward second speed is obtained when the sun gear is restrained under the condition that transmission power is still input to the ring gear of the single planetary gear; a forward third speed is obtained by rotating the whole gear unit together; and a reverse speed is obtained when transmission power is input to the sun gear, and the ring gear of the dual planetary gear is restrained, said automatic transmission constituting four forward speed modes and one reverse speed mode by the planetary gear unit and the sub gear unit.

3. A hydraulic control device for an automatic transmission according to claim 1, wherein the first and second ports of the first emergency control valve are disconnected by control pressure applied to the second control chamber of the first emergency control valve when the first and second solenoid valves are off at the 1 range, and the first and second ports are connected by control pressure applied to the first control chamber at a third speed mode of the 3 range.

* * * * *